(12) United States Patent
Cecchin

(10) Patent No.: US 11,279,402 B2
(45) Date of Patent: Mar. 22, 2022

(54) METHOD AND SYSTEM FOR STEERING A GANTRY CRANE

(71) Applicant: CIMOLAI TECHNOLOGY SPA, Carmignano dl Brenta (IT)

(72) Inventor: Donato Cecchin, Galliera Veneta (IT)

(73) Assignee: CIMOLAI TECHNOLOGY SPA, Carmignano di Brenta (IT)

( * ) Notice: Subject to any disclaimer, the term of this patent is extended or adjusted under 35 U.S.C. 154(b) by 476 days.

(21) Appl. No.: 16/328,481

(22) PCT Filed: Aug. 26, 2016

(86) PCT No.: PCT/IT2016/000198
§ 371 (c)(1),
(2) Date: Feb. 26, 2019

(87) PCT Pub. No.: WO2018/037429
PCT Pub. Date: Mar. 1, 2018

(65) Prior Publication Data
US 2019/0225263 A1    Jul. 25, 2019

(51) Int. Cl.
*B62D 7/09* (2006.01)
*B62D 7/14* (2006.01)
(Continued)

(52) U.S. Cl.
CPC .............. *B62D 7/09* (2013.01); *B62D 7/142* (2013.01); *B62D 7/1509* (2013.01); *B66C 9/04* (2013.01); *B66C 19/005* (2013.01)

(58) Field of Classification Search
CPC ........ B62D 7/09; B62D 7/1509; B62D 7/142; B66C 9/04; B66C 19/005
See application file for complete search history.

(56) References Cited

U.S. PATENT DOCUMENTS 9,707,998 B2 * 7/2017 Ennemark ............ B62D 7/1509
2004/0195013 A1    10/2004 Spark
(Continued)

FOREIGN PATENT DOCUMENTS

GB    1222719 A    2/1971
WO    0032462 A1    6/2000

OTHER PUBLICATIONS

International Search Report dated May 26, 2017 re: Application No. PCT/IT2016/000198, pp. 1-4, citing: WO 00/32462 A1, US 2006/0180375 A1, US 2015/0307329 A1, US 2004/0195013 A1 and GB 1 222 719 A.

(Continued)

*Primary Examiner* — Minnah L Seoh
*Assistant Examiner* — Marlon A Arce
(74) *Attorney, Agent, or Firm* — Cantor Colburn LLP

(57) ABSTRACT

A method for steering a gantry crane having wheel assemblies includes the steps of: initiating movement of the gantry crane; and rotating the wheel assemblies wherein the front wheel assemblies rotate in a first rotational direction and the rear wheel assemblies rotate in a second rotational direction. The first rotational direction is opposite to the second rotational direction. First side wheel assemblies rotate at a first rotational speed and second side wheel assemblies rotate at a second rotational speed, such that the gantry crane moves from a linear path to an arcuate path with a turning radius decreasing to substantially zero for rotation about a central axis.

12 Claims, 6 Drawing Sheets

(51) Int. Cl.
*B66C 9/04* (2006.01)
*B66C 19/00* (2006.01)
*B62D 7/15* (2006.01)

(56) References Cited

U.S. PATENT DOCUMENTS

| | | | |
|---|---|---|---|
| 2005/0217906 A1* | 10/2005 | Spark | B62D 1/12 |
| | | | 180/22 |
| 2006/0180375 A1 | 8/2006 | Wierzba et al. | |
| 2009/0143939 A1* | 6/2009 | Rhodes | B62D 7/1509 |
| | | | 701/41 |
| 2015/0134202 A1* | 5/2015 | Dawson | B62D 6/007 |
| | | | 701/41 |
| 2015/0191202 A1* | 7/2015 | Otterbein | B62D 7/159 |
| | | | 701/41 |
| 2015/0307329 A1 | 10/2015 | Rosenström et al. | |

OTHER PUBLICATIONS

Written Opinion dated May 26, 2017 re: Application No. PCT/IT2016/000198, pp. 1-4, citing: WO 00/32462 A1, US 2006/0180375 A1, US 2015/0307329 A1, US 2004/0195013 A1 and GB 1 222 719 A.

* cited by examiner

| C [mm] 10000 | P1 [mm] 5000 | P2 [mm] -5000 | |
|---|---|---|---|
| $\beta 1$ Wheel 1Left (closed side) | $\alpha 1$ Wheel 1Right (closed side) | $\beta 2$ Wheel 2Left (open side) | $\alpha 2$ Wheel 2Right (open side) |
| 1.00 | 0.97 | -1.00 | -0.97 |
| 2.00 | 1.87 | -2.00 | -1.87 |
| 3.00 | 2.72 | -3.00 | -2.72 |
| 4.00 | 3.51 | -4.00 | -3.51 |
| 5.00 | 4.26 | -5.00 | -4.26 |
| 6.00 | 4.96 | -6.00 | -4.96 |
| 7.00 | 5.63 | -7.00 | -5.63 |
| 8.00 | 6.26 | -8.00 | -6.26 |
| 9.00 | 6.86 | -9.00 | -6.86 |
| 10.00 | 7.43 | -10.00 | -7.43 |
| 11.00 | 7.97 | -11.00 | -7.97 |
| 12.00 | 8.48 | -12.00 | -8.48 |
| 13.00 | 8.98 | -13.00 | -8.98 |
| 14.00 | 9.45 | -14.00 | -9.45 |
| 15.00 | 9.90 | -15.00 | -9.90 |
| 16.00 | 10.33 | -16.00 | -10.33 |
| 17.00 | 10.74 | -17.00 | -10.74 |
| 18.00 | 11.14 | -18.00 | -11.14 |
| 19.00 | 11.52 | -19.00 | -11.52 |
| 20.00 | 11.89 | -20.00 | -11.89 |
| 21.00 | 12.25 | -21.00 | -12.25 |
| 22.00 | 12.60 | -22.00 | -12.60 |
| 23.00 | 12.93 | -23.00 | -12.93 |
| 24.00 | 13.25 | -24.00 | -13.25 |
| 25.00 | 13.57 | -25.00 | -13.57 |
| 26.00 | 13.87 | -26.00 | -13.87 |
| 27.00 | 14.16 | -27.00 | -14.16 |
| 28.00 | 14.45 | -28.00 | -14.45 |
| 29.00 | 14.73 | -29.00 | -14.73 |
| 30.00 | 15.00 | -30.00 | -15.00 |
| 31.00 | 15.26 | -31.00 | -15.26 |
| 32.00 | 15.52 | -32.00 | -15.52 |
| 33.00 | 15.77 | -33.00 | -15.77 |
| 34.00 | 16.02 | -34.00 | -16.02 |
| 35.00 | 16.26 | -35.00 | -16.26 |
| 36.00 | 16.50 | -36.00 | -16.50 |
| 37.00 | 16.73 | -37.00 | -16.73 |
| 38.00 | 16.96 | -38.00 | -16.96 |
| 39.00 | 17.18 | -39.00 | -17.18 |
| 40.00 | 17.40 | -40.00 | -17.40 |
| 41.00 | 17.61 | -41.00 | -17.61 |
| 42.00 | 17.82 | -42.00 | -17.82 |
| 43.00 | 18.03 | -43.00 | -18.03 |
| 44.00 | 18.23 | -44.00 | -18.23 |
| 45.00 | 18.43 | -45.00 | -18.43 |
| 46.00 | 18.63 | -46.00 | -18.63 |
| 47.00 | 18.83 | -47.00 | -18.83 |
| 48.00 | 19.02 | -48.00 | -19.02 |
| 49.00 | 19.21 | -49.00 | -19.21 |
| 50.00 | 19.40 | -50.00 | -19.40 |
| 51.00 | 19.59 | -51.00 | -19.59 |
| 52.00 | 19.78 | -52.00 | -19.78 |
| 53.00 | 19.96 | -53.00 | -19.96 |
| 54.00 | 20.14 | -54.00 | -20.14 |
| 55.00 | 20.32 | -55.00 | -20.32 |
| 56.00 | 20.50 | -56.00 | -20.50 |
| 57.00 | 20.68 | -57.00 | -20.68 |
| 58.00 | 20.86 | -58.00 | -20.86 |
| 59.00 | 21.03 | -59.00 | -21.03 |
| 60.00 | 21.21 | -60.00 | -21.21 |
| 61.00 | 21.38 | -61.00 | -21.38 |
| 62.00 | 21.55 | -62.00 | -21.55 |
| 63.00 | 21.73 | -63.00 | -21.73 |
| 64.00 | 21.90 | -64.00 | -21.90 |
| 65.00 | 22.07 | -65.00 | -22.07 |
| 66.00 | 22.24 | -66.00 | -22.24 |
| 67.00 | 22.41 | -67.00 | -22.41 |
| 68.00 | 22.59 | -68.00 | -22.59 |
| 69.00 | 22.76 | -69.00 | -22.76 |
| 70.00 | 22.93 | -70.00 | -22.93 |
| 71.00 | 23.10 | -71.00 | -23.10 |
| 72.00 | 23.27 | -72.00 | -23.27 |
| 73.00 | 23.45 | -73.00 | -23.45 |
| 74.00 | 23.62 | -74.00 | -23.62 |
| 75.00 | 23.79 | -75.00 | -23.79 |
| 76.00 | 23.97 | -76.00 | -23.97 |
| 77.00 | 24.14 | -77.00 | -24.14 |
| 78.00 | 24.32 | -78.00 | -24.32 |
| 79.00 | 24.50 | -79.00 | -24.50 |
| 80.00 | 24.68 | -80.00 | -24.68 |
| 81.00 | 24.86 | -81.00 | -24.86 |

Fig. 9

# METHOD AND SYSTEM FOR STEERING A GANTRY CRANE

TECHNICAL FIELD

This disclosure relates to the field of steering systems for cranes and, more particularly, to the field of steering systems for a gantry crane.

BACKGROUND

Steering systems for industrial cranes such as gantry cranes are generally well known. A gantry crane is a large machine, capable of lifting objects. A gantry crane is generally used for lifting and transporting large cargo containers to and from railroad cars, truck trailers and other locations as well as for lifting and transporting boats.

Gantry cranes consist generally of a four-sided steel-framed structure, having vertical legs extending upward from wheel assemblies at the four corners of the structure, a top frame structure connected to its vertical legs, a lifting assembly supported by the frame structure, an engine, a user interface, and a control system for driving and turning the wheels and for controlling the machine's lifting capabilities.

An operator utilizes the steering system to steer the gantry crane between points in the operational area. In some operational areas, the containers are stacked in rows. Accordingly, the gantry crane is moved in linear directions, parallel to the rows of containers or perpendicular container rows. In order to change from moving in a parallel direction to a transverse direction, the direction-locking of the wheels or wheel arrangements is disengaged and the wheels or wheel arrangements are turned 90 degrees, to the required drive direction, and locked.

In other operational areas, the container rows are in different areas that may not be parallel to one another. Thus, the gantry crane is required to change the driving direction in order to move efficiently from one area to another. Accordingly, the wheels or wheel arrangements of the rubber-tyred gantry cranes may be locked to an intermediate locking position that enables turning drive of the crane about a centre point.

US2006180375 describes a steering system for a gantry crane. The steering system is capable of carousel steering mode. To position the wheels of the crane into the proper steering position for the carousel mode, the controller is programmed to move the angular position of each wheel one of clockwise and counter clockwise, to effect the smallest amount of angular movement necessary. The controller is also programmed to disable the engine drive prior to positioning the wheels in the carousel steering mode, and to enable the engine drive after the wheels are in position to effect the carousel steering mode.

This, however, when the wheels are positioned for carousel steering, causes great pressure on the tyres that support the gantry crane. The tyres are consumed quickly due to the pressure applied on the tyres through contact with the ground while the gantry crane is stationary. In addition, the angular positing of the wheels while the gantry crane is stationary produces an excessive pressure on the hydraulic system. Further, the torsional forces generated during the angular positing of the wheels have a negative effect on the mechanical parts that support the wheels. The torsional forces may actually reduce the lifespan of the gantry crane or of components thereof.

The present disclosure is directed, at least in part, to improving or overcoming one or more aspects of the prior art system.

SUMMARY

In a first aspect, the present disclosure describes a method for steering a gantry crane having wheel assemblies, the method comprising the steps of: initiating movement of the gantry crane; and rotating the wheel assemblies wherein the front wheel assemblies rotate in a first rotational direction and the rear wheel assemblies rotate in a second rotational direction, the first rotational direction being opposite to the second rotational direction and wherein a first side wheel assemblies rotate at a first rotational speed and a second side wheel assemblies rotate at a second rotational speed, such that the gantry crane moves from a linear path to an arcuate path with a turning radius decreasing to substantially zero for rotation about a central axis.

In a second aspect, the present disclosure describes a steering system for a gantry crane, the steering system comprising: front wheel assemblies connected proximate a front portion of the gantry crane, the front wheel assemblies comprising a first side front wheel assembly and a second side front wheel assembly; rear wheel assemblies connected proximate a rear portion of the gantry crane, the rear wheel assemblies comprising a first side rear wheel assembly and a second side rear wheel assembly; and, a user interface for steering control of the gantry crane, and a programmable controller for controlling the angular position of each wheel assembly to effect a concentric rotary steering mode selected through the user interface.

BRIEF DESCRIPTION OF THE DRAWINGS

The foregoing and other features and advantages of the present disclosure will be more fully understood from the following description of various embodiments, when read together with the accompanying drawings, in which:

FIG. 9 illustrates the changes of the wheel assemblies in 1° intervals starting from 0° in one embodiment of a gantry crane steering left.

DETAILED DESCRIPTION OF THE DRAWINGS

This disclosure generally relates to a method and a system for steering a gantry crane, including boat hoists in general. The method and steering system may be also provided in other types of cranes.

Figure 1:
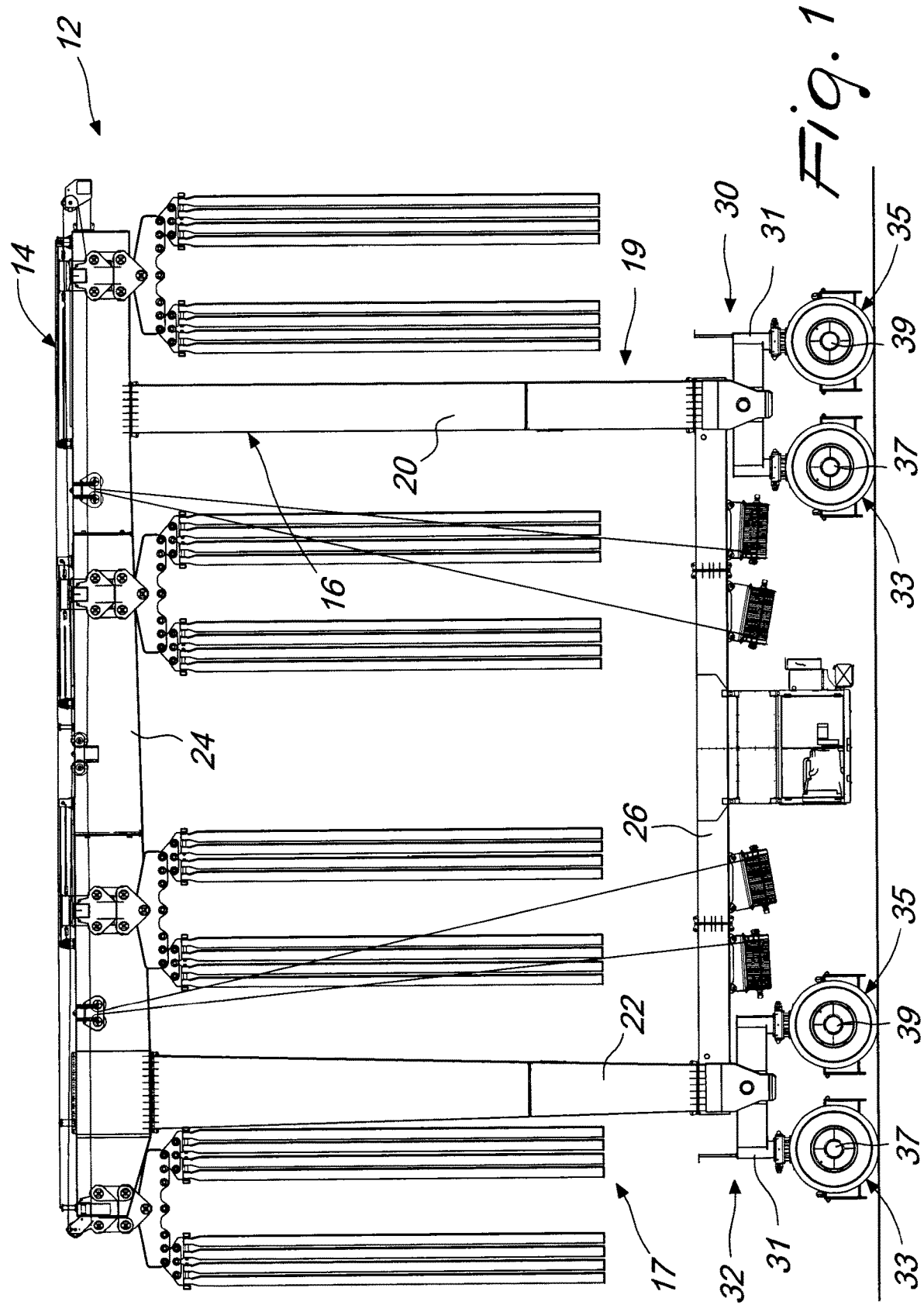
FIG. 1 is a side view of a gantry crane according to the present disclosure.
Figure 2:
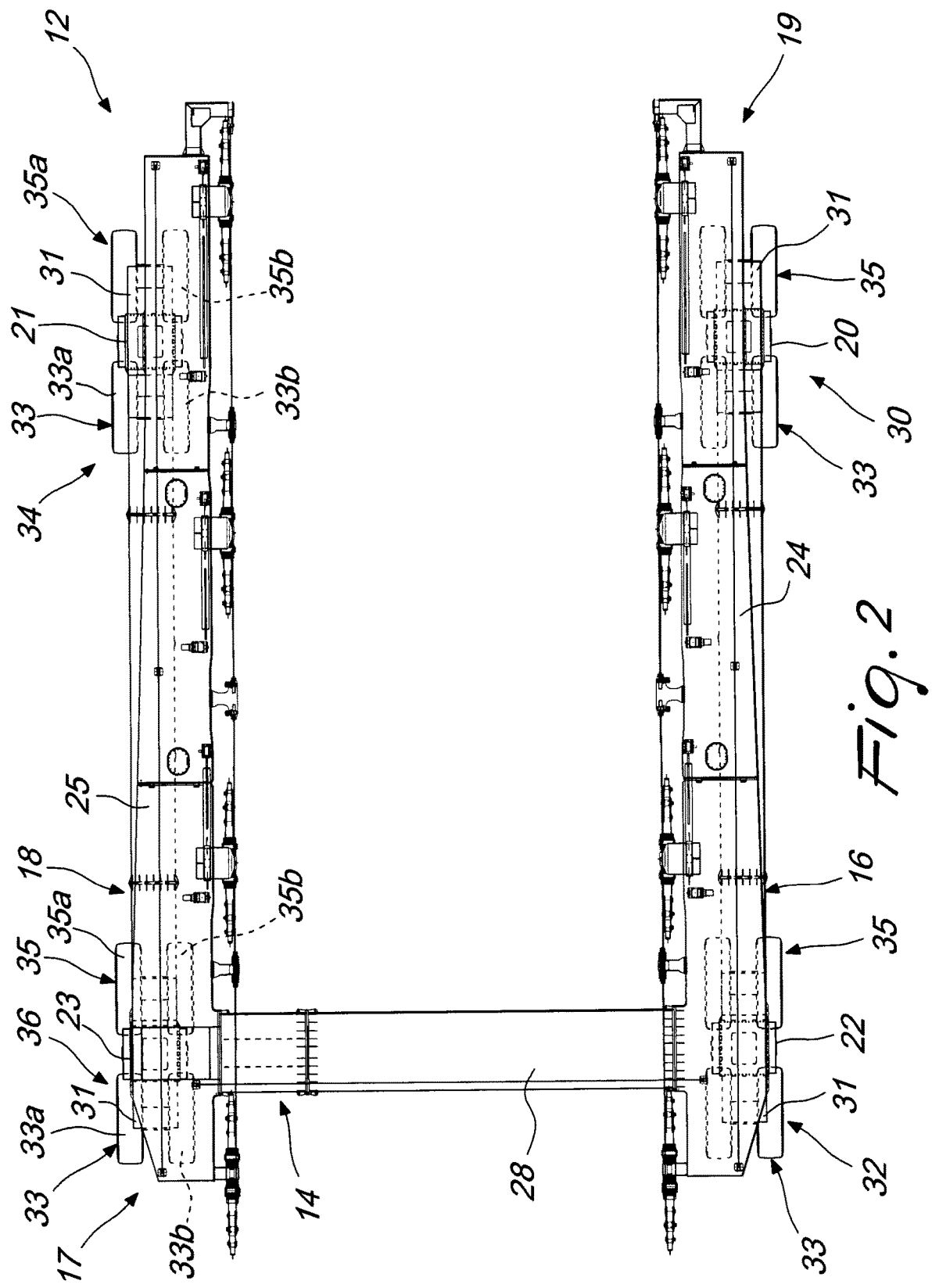
FIG. 2 is a plan view of the gantry crane of FIG. 1.
Figure 3:
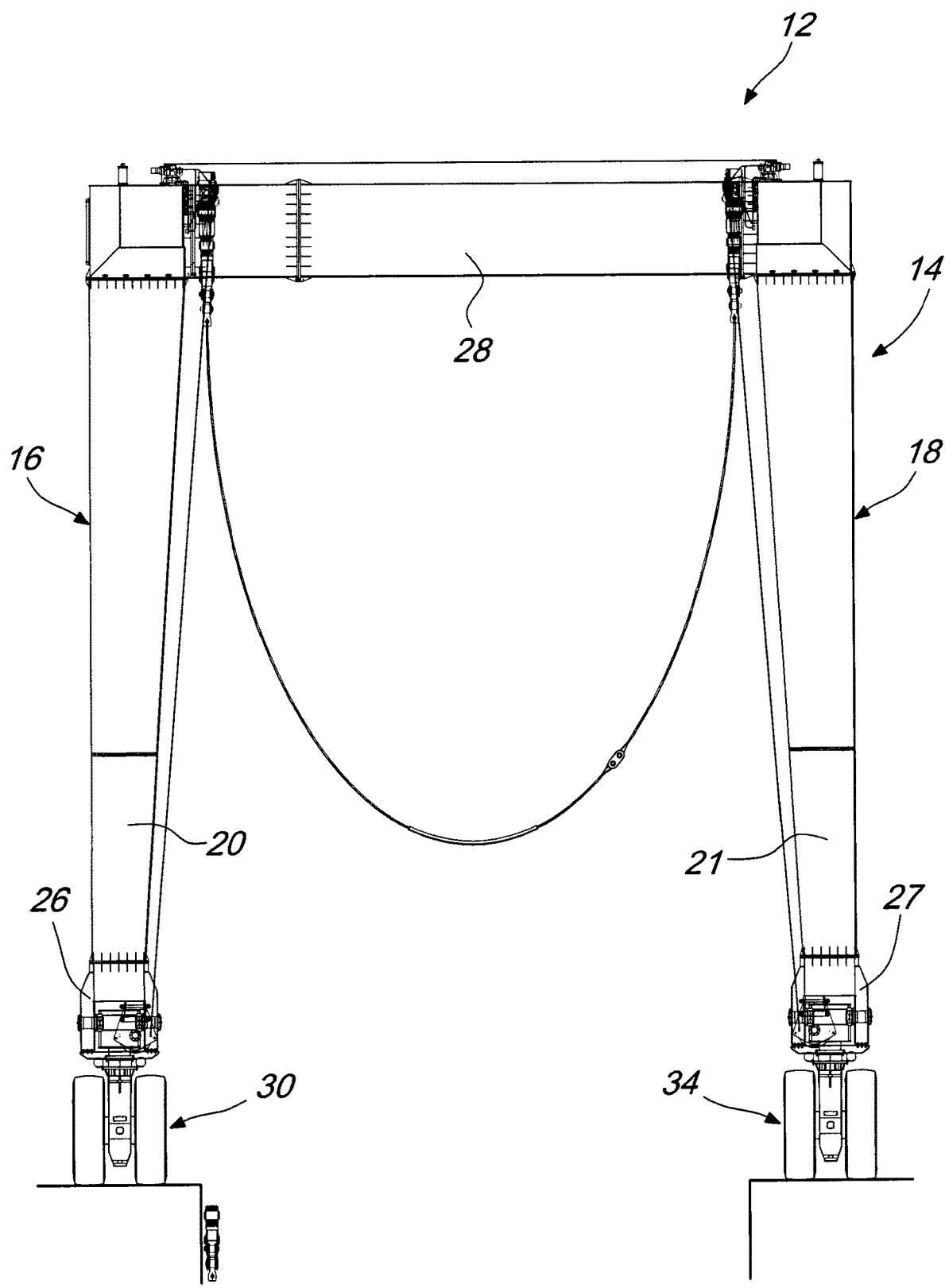
FIG. 3 is a front view of the gantry crane of FIG. 1.

FIGS. 1 to 3, illustrate a gantry crane 12 having a steering system 10. The gantry crane 12 of FIG. 1 shows a gantry crane for hauling boats. The following description to the method and system 10 for steering a mobile boat hauling type gantry crane is to be understood as being exemplary.

The gantry crane 12 generally includes a gantry structure 14. The gantry structure 14 has a first side support frame 16 and a second side support frame 18. In an embodiment, the terms "first side" and "second side" represent the left and right sides of the gantry crane 12. It is to be understood that the references to the "right" and "left" sides are from the perspective of the gantry crane 12 in FIG. 2. In alternative embodiment, the terms "first side" and "second side" represent the right and left sides of the gantry crane 12. The first side support frame 16 and the second side support frame 18 are substantially identical for the purposes of this description.

An upper cross beam 28 extends between the first side support frame 16 and the second side support frame 18. The upper cross beam 28 connects the first side support frame 16 and the second side support frame 18. The upper cross beam 28 connects an end of first side support frame 16 to a corresponding end of the second side support frame 18.

The upper cross beam 28 can be adjustable. In an embodiment, the upper cross beam 28 can include a flanged joint or other structure to allow for adjusting the length of the upper cross beam 28, and thus the width of the gantry crane 12.

The gantry structure 14 has a front portion 17 and a rear portion 19. The upper cross beam 28 is located at the front portion 17. It is to be understood that the terms "front" and "rear" define ends of the gantry crane 12. In a crane without a clear distinction between the ends, the terms can be assigned to such ends respectively.

The first side support frame 16 comprises a first side rear column 20, a first side front column 22, a first side upper beam 24 and a first side lower beam 26. The first side upper beam 24 and the first side lower beam 26 extend between the first side rear column 20 and the first side front column 22. The first side upper beam 24 and the first side lower beam 26 connect the first side rear column 20 to the first side front column 22.

A first side rear wheel assembly 30 is positioned at the rear portion 19 of the gantry crane 12. The first side rear wheel assembly 30 is located adjacent a lower end of the first side rear column 20. A first side front wheel assembly 32 is positioned at the front portion 17 of the gantry crane 12. The first side front wheel assembly 32 is located adjacent a lower end of the first side front column 22.

The second side support frame 18 comprises a second side rear column 21, a second side front column 23, a second side upper beam 25 and a second side lower beam 27. The second side upper beam 25 and the second side lower beam 27 extend between the second side rear column 21 and the second side front column 23. The second side upper beam 25 and the second side lower beam 27 connect the second side rear column 21 to the second side front column 23.

A second side rear wheel assembly 34 is positioned at the rear portion 19 of the gantry crane 12. The second side rear wheel assembly 34 is located adjacent a lower end of the second side rear column 21. A second side front wheel assembly 36 is positioned at the front portion 17 of the gantry crane 12. The second side front wheel assembly 36 is located adjacent a lower end of the second side front column 23.

The wheel base of the gantry crane 12 is the distance between the rear wheel assemblies 30, 34 and the front wheel assemblies 32, 36. The width of the gantry crane 12 is the distance between the first side wheels 30, 32 and the second side wheels 34, 36.

In an embodiment, each wheel assembly 30, 32, 34, 36 comprises a bogie frame 31 having two tandem wheel pairs 33, 35. Each bogie frame 31 is mounted at the lower end of a respective column 20, 21, 22, 23. Each bogie frame 31 is rotatable about a rotational axis. In an embodiment, the rotational axis is coincident with the vertical axis of the respective column 20, 21, 22, 23. Each pair may have an outer wheel 33a, 35a and an inner wheel 33b, 35b. In a further embodiment, one wheel in a wheel pair 33, 35 is a drive wheel, while the other is an idle wheel.

The wheels 33a, 33b and 35a, 35b of the wheel pairs 33 and 35 are placed on both sides of the axels 37 and 39, which extend downwardly from the bogie frame 31. The wheels 33a, 33b and 35a, 35b are mounted on bearings at the lower ends of axels 37 and 39. The wheels 33a, 33b and 35a, 35b are mounted on the sides of the axels 37 and 39. In an embodiment, the wheels 33a, 33b and 35a, 35b rotate with the axels 37 and 39 about their vertical axes. The wheels 33a, 33b and 35a, 35b are offset from the vertical axes. Each wheel is rotatable about a rotational axis. In an embodiment, the rotational axis is coincident with the vertical axis of the axel.

In an alternative embodiment, each wheel assembly 30, 32, 34, 36 comprises a single wheel. Each wheel is mounted on bearings at the lower end of an axel that is connected to respective column 20, 21, 22, 23. Each wheel 30, 32, 34, 36 is independently controlled. Each wheel 30, 32, 34, 36 is rotatable about a rotational axis. In an embodiment, the rotational axis is coincident with the vertical axis of the axel. The rotational axis intersects the wheel. The vertical axis of the axel intersects the wheel.

The steering system 10 for the gantry crane 12 comprises front wheel assemblies 32, 36 connected proximate a front portion 17 of the gantry crane 12, the front wheel assemblies 32, 36 comprising a first side front wheel assembly 32 and a second side front wheel assembly 36; rear wheel assemblies 30, 34 connected proximate a rear portion 19 of the gantry crane 12, the rear wheel assemblies 30, 34 comprising a first side rear wheel assembly 30 and a second side rear wheel assembly 34; and a control system connected to the gantry crane 12 having a user interface operably connected for steering control of the gantry crane 12, and a programmable controller responsive for controlling the angular position of each wheel assembly 30, 32, 34, 36 to effect a concentric rotary steering mode selected through the user interface with the gantry crane 12 in movement.

Figure 5:
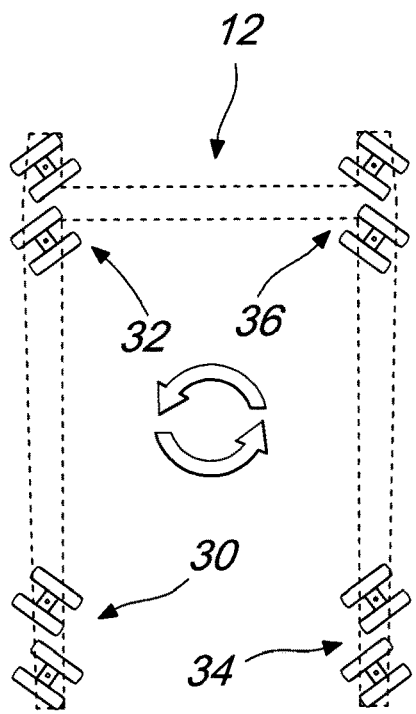
FIG. 5 illustrates standing rotation of gantry crane of FIG. 1.

The concentric rotary steering mode enables the gantry crane 12 to move into the standing rotation while in motion. In the concentric rotary steering mode the gantry crane 12 moves to standing rotation from starting in a linear path. FIG. 5 illustrates a standing rotation of the gantry crane 12.

Figure 4:
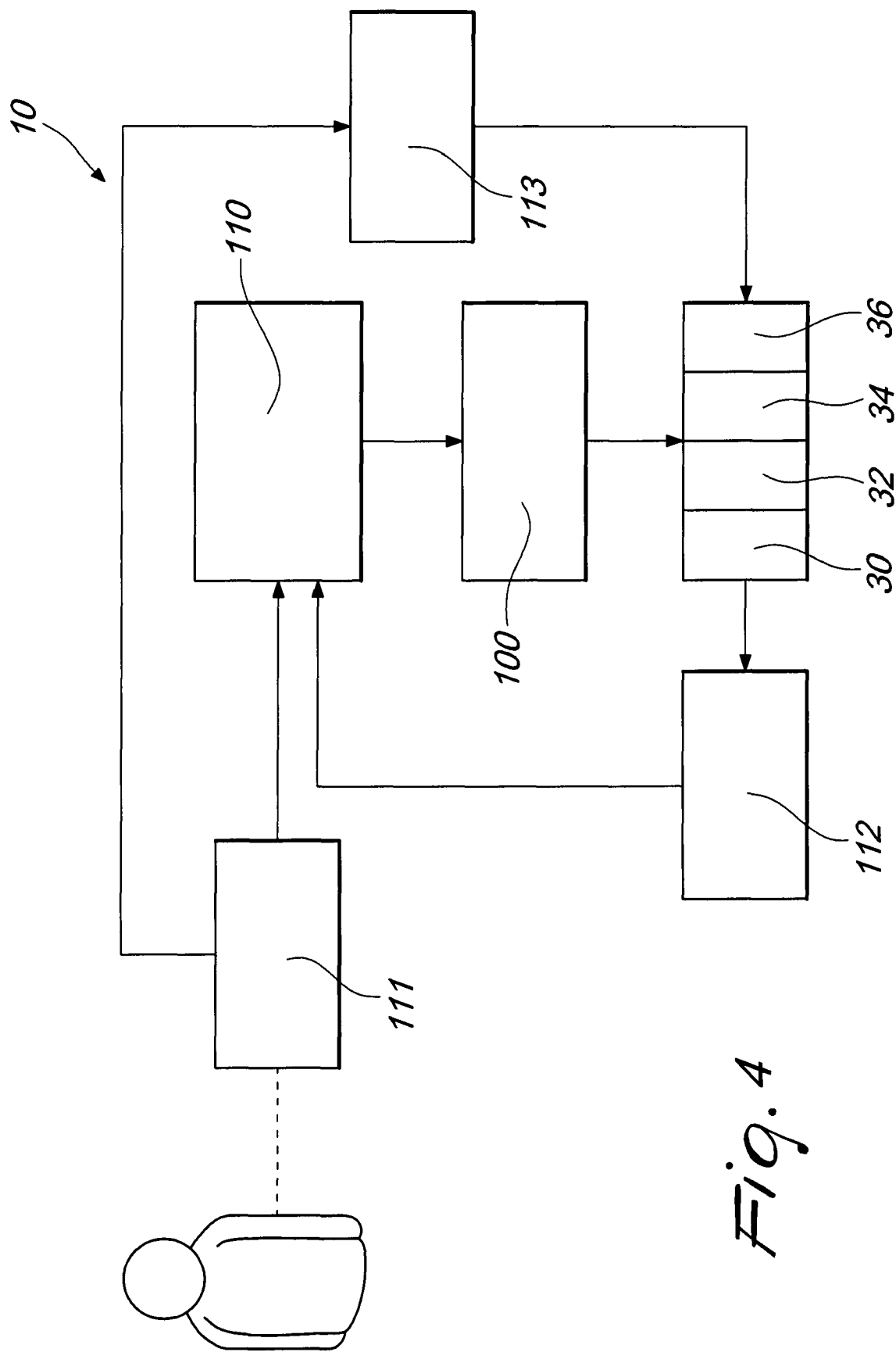
FIG. 4 is a block diagram of the steering system for the gantry crane of FIG. 1.

With respect to FIG. 4, the steering system 10 is configured and programmed to monitor and control the position of the wheel assemblies 30, 32, 34, 36. The steering system 10 further comprises: a programmable controller 110; the hydraulic assembly 100 controlled by the programmable controller 110, a user or operator interface 111, and a plurality of sensors 112. The programmable controller 110 is programmed to accommodate the various steering modes and safety functions described herein. The gantry crane has a drive engine for movement thereof. The drive engine effects turning of the wheel assemblies 30, 32, 34, 36. The steering system 10 is coupled to the drive engine.

Each wheel assembly 30, 32, 34, 36 is coupled to a respective hydraulic assembly 100. The hydraulic assembly 100 is operably connected to the steering system 10. Each hydraulic assembly receives control or turn signals from the steering system 10 and operates accordingly to rotate the respective wheel assembly 30, 32, 34, 36 to a required position. The rotation of the wheel assemblies is controlled by a programmable controller 110. The hydraulic assembly 100 comprises a hydraulic motor with a pinion drive gear. Other steering systems, known in the art, can also be used for turning the wheels. For example, a hydraulic cylinder system with appropriate linkages can be used in place of the hydraulic motor and pinion drive gear.

The steering system 10 enables the gantry crane 12 to be steered as required in an operational area. The steering system 10 enables steering in a four wheel mode wherein all wheel assemblies 30, 32, 34, 36 are engaged to move the gantry crane 12. The gantry crane 12 is capable of standing rotation wherein the gantry crane 12 turns about a central axis. In standing rotation the gantry crane 12 has a substantially zero turning radius.

A method of effecting concentric rotary steering in a gantry crane having wheel assemblies 30, 32, 34, 36 is herein described. The method for steering the gantry crane 12 comprises the steps of initiating movement of the gantry crane 12. The gantry crane 12 is moving with the drive engine effecting the turning of the wheel assemblies 30, 32, 34, 36. The gantry crane 12 is able to move into standing rotation while in motion. The wheel assemblies 30, 32, 34, 36 are rotated while the gantry crane 12 is moving. The front wheel assemblies 32, 36 rotate in a first rotational direction and the rear wheel assemblies 30, 34 rotate in a second rotational direction. The first rotational direction is opposite to the second rotational direction. The first side wheel assemblies 30, 32 rotate at a first rotational speed and the second side wheel assemblies 34, 36 rotate at a second rotational speed. The method enables the gantry crane 12 to move from a linear path to an arcuate path with a turning radius decreasing to substantially zero for rotation about a central axis.

The method allows the gantry crane 12 to rotate with a turning radius that decreases with an increase in the angle of rotation of each wheel assembly 30, 32, 34, 36 relative to the respective rotational axis. The method allows the positioning of the wheel assemblies 30, 32, 34, 36 dynamically, for example by acting on the user interface 111. The user interface 111 may be a joystick. The joystick steers the gantry crane by tilting the lever to the right or left depending on the most convenient direction according to the operational situation.

In an embodiment, the method allows the positioning of the wheel assemblies 30, 32, 34, 36 dynamically simultaneously with a maneuver of translation. In the method, steering limits will be automatically reset by the programmable controller 110 that allows a continuation of movement in an arcuate path until the gantry crane 12 reaches a position that corresponds to a standing rotation.

In an embodiment, over substantially the entire duration of concentric rotary steering procedure, the method tracks the wheel assemblies 30, 32, 34, 36 according to an algorithm that takes into account the geometries of the gantry crane 12 (wheel or track). This allows the use of a translation movement without risking damage to the mechanisms of gantry crane 12 in the case the operator performs a translational movement in the same direction in a continuous manner.

Figure 6:
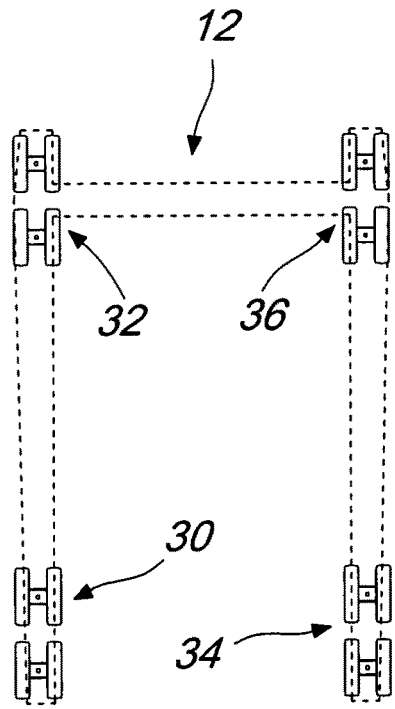
FIG. 6 illustrates the starting positions of the wheel assemblies of gantry crane of FIG. 1.

A starting point for the method may be with the wheel assemblies 30, 32, 34, 36 at 0° as illustrated in FIG. 6. The wheel assemblies 30, 32, 34, 36 are parallel to the longitudinal axis of the gantry crane. With 0° of the wheel assemblies 30, 32, 34, 36 the gantry crane 12 is steered along a linear path in a forward or reverse direction.

After having selected and enabled the concentric rotary steering mode, the operator tilts the steering joystick to the right or left depending on the requirement at the operational area. The gantry crane 12 starts to move and the wheel assemblies 30, 32, 34, 36 begin to rotate according to one or more set points determined by the programmable controller 110. The set points may increase with a variable speed, for instance depending on the availability of the hydraulic liquid. In the case of a square vehicle, wheel assemblies 30, 32, 34, 36 will rotate up to a concentric position with respect to the rotational axis to value equal to 45°.

Figure 7:
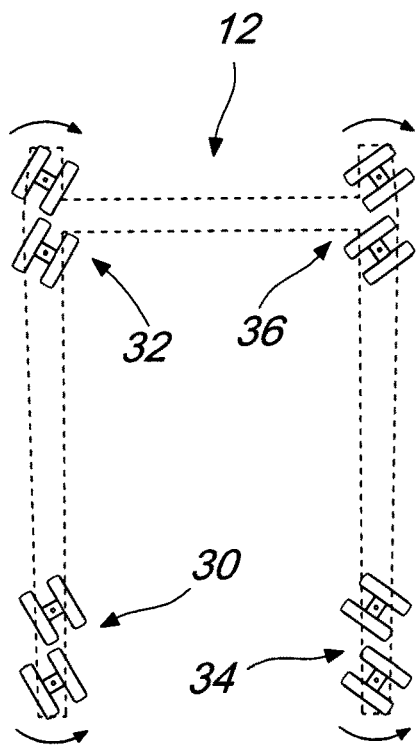
FIG. 7 illustrates the wheel assemblies of gantry crane of FIG. 1 that is steered right.

FIG. 7 illustrates a gantry crane 12 that performs the concentric rotary steering mode to the right. The first rotational direction of the front wheel assemblies 32, 36 is the clockwise direction. The second rotational direction of the rear wheel assemblies 30, 34 is the anti-clockwise direction. The first rotational speed of the first side wheel assemblies 30, 32 is lesser than the second rotational speed of the second side wheel assemblies 34, 36.

The first side front wheel assembly 32 rotates 45°, the second side front wheel assembly 36 rotates 135°, the first side rear wheel assembly 30 rotates 45° and the second side rear wheel assembly 34 rotates 135° from respective initial positions parallel to a longitudinal axis of the gantry crane.

Figure 8:
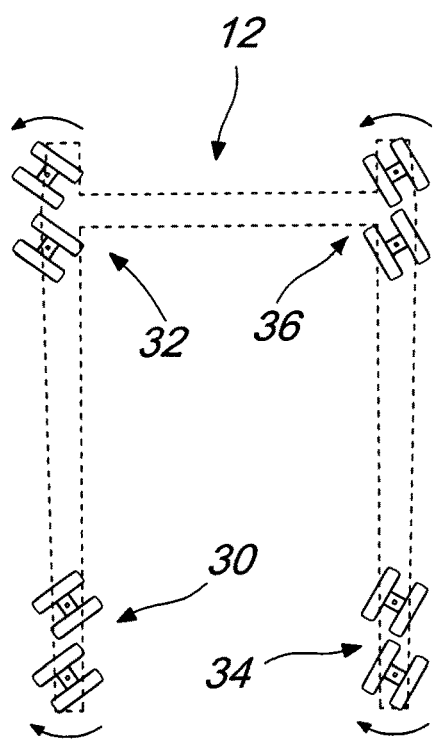
FIG. 8 illustrates the wheel assemblies of gantry crane of FIG. 1 that is steered left.

FIG. 8 illustrates a gantry crane 12 that performs the concentric rotary steering mode to the left. The first rotational direction of the front wheel assemblies 32, 36 is the anti-clockwise direction. The second rotational direction of the rear wheel assemblies 30, 34 is the clockwise direction. The first rotational speed of the first side wheel assemblies 30, 32 is greater than the second rotational speed of the second side wheel assemblies 34, 36.

The first side front wheel assembly 32 rotates 135°, the second side front wheel assembly 36 rotates 45°, the first side rear wheel assembly 30 rotates 135° and the second side rear wheel assembly 34 rotates 45° from respective initial positions parallel to a longitudinal axis of the gantry crane.

With reference to FIG. 9, an illustrative table is presented showing the angular rotations of each wheel assembly 30, 32, 34, 36 while the gantry crane switches to carousel mode.

"C" is the width of the gantry crane 12 as already defined, i.e. the distance between the first side wheel assemblies 30, 32 and the second side wheel assemblies 34, 36; "P1" is half of the wheel base, i.e. half of the distance between the rear wheel assemblies 30, 34 and the front wheel assemblies 32, 36; "P2" is the same value as "P1", with opposite sign; $\beta 1$ is the angle of wheel assembly 30, taken as reference for the rotation; $\alpha 1$, $\beta 2$ and $\alpha 1$ are the corresponding angles of wheel assemblies 36, 32 and 34, respectively. The terms "open side" and "closed side" refer, for ease of explanation, to the schematic views of a gantry crane as shown in FIGS. 5 and 6, where "closed side" refers to the closed side of the C shape crane (wheel assemblies 32 and 36) and "open side" refers to the opposite side (wheel assemblies 30 and 34).

The illustrated values would be automatically re-modulated by the programmable controller 110 software according to the wheel base and the width of the gantry crane 12. For the return to zero degrees, the method may follow the same rules as above in the reverse order.

In particular, the following formulas may be used for determining the angular position of wheel assemblies 36, 32 and 34 according to the angular position of wheel assembly 30:

$$\alpha 1° = P1/(|P1|)*\{90 - [\tan^{-1}((C+P1*\tan(90-\beta 1))/[P1|)]\} - 90*(1 - \beta 1/(|\beta 1|)):$$

$\beta 2°+-\beta 1°$;

$\alpha 2°=\alpha 1°$;

The distances in the formula are calculated considering the centers of the first and of the second side wheels and the centers of the rear and of the front wheel assemblies.

It is noted that, while the illustrative gantry crane shown in FIGS. 5 and 6 is of the square type, similar considerations apply to gantry cranes of different shapes, in particular to gantry cranes having a rectangular shape or, more precisely, to gantry cranes having wheel assemblies positioned at the four corners of a rectangle.

An embodiment of the gantry crane 12 operation in the concentric rotary steering mode is now described. Each wheel assembly 30, 32, 34, 36 is controlled by an encoder that communicates with the programmable controller 110 via field bus Profibus or profinet. In this way, the programmable controller 110 is informed in real time on the position of each wheel assembly 30, 32, 34, 36.

A proportional distributor for each wheel assembly 30, 32, 34, 36 sends oil to the hydraulic circuit, of the hydraulic assembly 100, which feeds the actuator that turns each wheel assembly 30, 32, 34, 36. The signal to the hydraulic distributor will be proportional and appropriately functionally modulated in the elaboration of the positional data of each wheel assembly 30, 32, 34, 36 as provided by the encoder, in particular as a function of the speed of movement, as a function of the pressure of the hydraulic pressure circuit according to the algorithms executed by the program complied and executed by the processor of the programmable controller 110. For the rotation of the wheel assemblies 30, 32, 34, 36, electrical drives and electrical actuators can be used as an alternative to the hydraulic distributor and hydraulic actuators.

Pressure sensors may monitor, in real-time, the position on the steering circuit of each rotational group automatically modulating the speed of the whole movement in case the torque required to perform the movement exceeds the programmed values thereby avoiding compromising the durability of the mechanisms. The sensors can be installed directly on the wheel assemblies 30, 32, 34, 36 or groups in the thermal group according to the size and range of the machine.

Additional pressure sensors may control the hydraulic circuit pressure line and, if it exceeds the set maximum value, the movement may be blocked. An indication of the cause may be displayed in the HMI informing the operator of the situation. This security feature protects the mechanisms in the case of exceedingly high rotation efforts.

In the case of solution with electric actuators the torque generated by the electric motors may be monitored. These values will be derived from the actuators that drive engines.

A sensor may monitor the diesel engine system rpms allowing the programmable controller 110 to modulate the speed of steering movement in function of the availability of the flow rate of hydraulic oil supplied by the variable displacement pumps. The programmable controller 110 may process the values given by the transducers in the field and control systems, and it may modulate or block the movement.

The skilled person would appreciate that foregoing embodiments may be modified or combined to obtain the steering system 10 of the present disclosure.

INDUSTRIAL APPLICABILITY

This disclosure describes a steering system 10 for a gantry crane 12. The gantry crane 12 is capable of performing a standing rotation in order to turn about a central axis. Standing rotation allows rotation of gantry crane 12 over 360° about a central axis. The gantry crane 12 initially moves from a linear path to an arcuate path and finally to a standing rotation. As the gantry crane 12 moves, all wheels of the wheel assemblies 30, 32, 34, 36 turn while undergoing rotation. In addition, all wheels of the wheel assemblies 30, 32, 34, 36 turn in the same direction so that the gantry crane 12 is able to move from the linear path to the arcuate path.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

One skilled in the art will realise the disclosure may be embodied in other specific forms without departing from the disclosure or essential characteristics thereof. The foregoing embodiments are therefore to be considered in all respects illustrative rather than limiting of the disclosure described herein. Scope of the invention is thus indicated by the appended claims, rather than the foregoing description, and all changes that come within the meaning and range of equivalence of the claims are therefore intended to be embraced therein.

The invention claimed is:

1. A method for steering a gantry crane having wheel assemblies, the method including the following steps:
    initiating movement of the gantry crane; and
    rotating the wheel assemblies wherein the front wheel assemblies rotate in a first rotational direction and the rear wheel assemblies rotate in a second rotational direction, the first rotational direction being opposite to the second rotational direction and
    wherein a first side wheel assemblies rotate at a first rotational speed and a second side wheel assemblies rotate at a second rotational speed, such that the gantry crane moves from a linear path to an arcuate path with a turning radius decreasing to substantially zero for rotation about a central axis, and
        wherein the angular position of the first side rear wheel assembly and of the second side front and rear wheel assemblies are calculated according to the angular position of the first side front wheel assembly.

2. The method of claim 1, wherein the first rotational direction is clockwise and the second rotational direction is counter-clockwise.

3. The method of claim 2, wherein the first rotational speed is less than the second rotational speed.

4. The method of claim 2, wherein the first side front wheel assembly rotates 45°, the second side front wheel assembly rotates 135°, the first side rear wheel assembly rotates 45°, and the second side rear wheel assembly rotates 135° from respective initial positions of 0°.

5. The method of claim 1, wherein the first rotational direction is counter-clockwise and the second rotational direction is clockwise.

6. The method of claim 5 wherein the first rotational speed is greater than the second rotational speed.

7. The method of claim 5 wherein the first side front wheel assembly rotates 135°, the second side front wheel assembly rotates 45°, the first side rear wheel assembly rotates 135°, and the second side rear wheel assembly rotates 45° from respective initial positions of 0°.

8. The method of claim 1, wherein the angular position of the first side rear wheel assembly and of the second side front and rear wheel assemblies are calculated according to the angular position of the first side front wheel assembly, using the following formulas:

$$\alpha1° = P1/(|P1|) * \{90 - [\tan^{-1}((C+P1*\tan(90-\beta1))/[P1|)]\} - 90*(1-\beta1/(|\beta1|));$$

$$\beta2° += \beta1°;$$

$$\alpha2° = \alpha1°,$$

wherein C is the width of the gantry crane, P1 is half of the distance between the rear wheel assemblies and the front wheel assemblies, P2 is the same value is P1, with the opposite sign; $\beta1$ is the angle of the first side front wheel assembly and $\alpha1$, $\beta2$, and $\alpha1$ are the corresponding angles of the first side rear wheel assembly and of the second side front and rear wheel assemblies.

9. A steering system for a gantry crane, the steering system comprising:
  front wheel assemblies connected proximate a front portion of the gantry crane, the front wheel assemblies comprising a first side front wheel assembly and a second side front wheel assembly;
  rear wheel assemblies connected proximate a rear portion of the gantry crane, the rear wheel assemblies comprising a first side rear wheel assembly and a second side rear wheel assembly;
  a user interface for steering control of the gantry crane; and
  a programmable controller for controlling the angular position of each wheel assembly to effect a concentric rotary steering mode selected through the user interface, and
  wherein the angular position of the first side rear wheel assembly and of the second side front and rear wheel assemblies are calculated according to the angular position of the first side wheel assembly.

10. The steering system of claim 9, further comprising a plurality of sensors for monitoring the angular position of the respective wheel assemblies.

11. The steering system of claim 9, further comprising a drive engine coupled to the wheel assemblies to effect movement of the gantry crane.

12. The steering system of claim 9, wherein the angular position of the first side rear wheel assembly and of the second side front and rear wheel assemblies are calculated according to the angular position of the first side front wheel assembly, using the following formulas:

$$\alpha1° = P1/(|P1|) * \{90 - [\tan^{-1}((C+P1*\tan(90-\beta1))/[P1|)]\} - 90*(1-\beta1/(|\beta1|));$$

$$\beta2° += \beta1°;$$

$$\alpha2° = \alpha1°,$$

wherein C is the width of the gantry crane, P1 is half of the distance between the rear wheel assemblies and the front wheel assemblies, P2 is the same value as P1, with the opposite sign; $\beta1$ is the angle of the first side front wheel assembly and $\alpha1$, $\beta2$, and $\alpha1$ are the corresponding angles of the first side rear wheel assembly and of the second side front and rear wheel assemblies.

* * * * *